United States Patent
Doll et al.

(10) Patent No.: US 12,525,918 B2
(45) Date of Patent: Jan. 13, 2026

(54) METHOD AND SYSTEM FOR ASSESSING SOLAR CELLS

(71) Applicants: Forschungszentrum Jülich GmbH, Jülich (DE); Friedrich-Alexander-Universität Erlangen-Nürnberg, Erlangen (DE)

(72) Inventors: Bernd Doll, Fürth (DE); Ian Marius Peters, Rückersdorf (DE); Claudia Buerhop-Lutz, Rückersdorf (DE); Christoph Brabec, Nuremberg (DE)

(73) Assignees: Forschungszentrum Jülich GmbH, Jülich (DE); Friedrich-Alexander-Universität Erlangen-Nürnberg, Erlangen (DE)

( * ) Notice: Subject to any disclaimer, the term of this patent is extended or adjusted under 35 U.S.C. 154(b) by 18 days.

(21) Appl. No.: 18/041,438

(22) PCT Filed: Aug. 27, 2021

(86) PCT No.: PCT/EP2021/073737
§ 371 (c)(1),
(2) Date: Feb. 13, 2023

(87) PCT Pub. No.: WO2022/049000
PCT Pub. Date: Mar. 10, 2022

(65) Prior Publication Data
US 2023/0299717 A1    Sep. 21, 2023

(30) Foreign Application Priority Data
Sep. 1, 2020 (DE) ..................... 10 2020 210 999.0

(51) Int. Cl.
*H04N 23/74* (2023.01)
*B64D 47/02* (2006.01)
(Continued)

(52) U.S. Cl.
CPC .............. *H02S 50/15* (2014.12); *B64D 47/02* (2013.01); *B64D 47/08* (2013.01);
(Continued)

(58) Field of Classification Search
CPC .......... H04N 23/00; H02S 50/15; B64D 47/00
See application file for complete search history.

(56) References Cited

U.S. PATENT DOCUMENTS

| 4,661,770 A | 4/1987 | Von Roos |
| 5,006,717 A | 4/1991 | Tsutsu |

(Continued)

FOREIGN PATENT DOCUMENTS

| DE | 102005040010 A1 | 3/2007 |
| DE | 102007057011 A1 | 6/2009 |

(Continued)

OTHER PUBLICATIONS

English Translation of Written Opinion of the International Searching Authority corresponding to counterpart International application No. 1PCT/EP2021/073737 issued Mar. 7, 2023.

(Continued)

*Primary Examiner* — Maryam A Nasri

(74) *Attorney, Agent, or Firm* — Renner, Otto, Boisselle & Sklar, LLP

(57) ABSTRACT

A method for assessing solar cells having one or more light sources that are fastened to a fastening device, with the light sources movably fastened to the fastening device and/or a light intensity control, provided with which the light intensity of each light source can be changed independently of the other light sources, with a camera fastened to the fastening device, the method including: the fastening device is aligned relative to solar cells by the camera so that the camera axis of the camera is substantially perpendicular to the surface of the solar cells to be assessed, the light sources are aligned (Continued)

Figure 1:
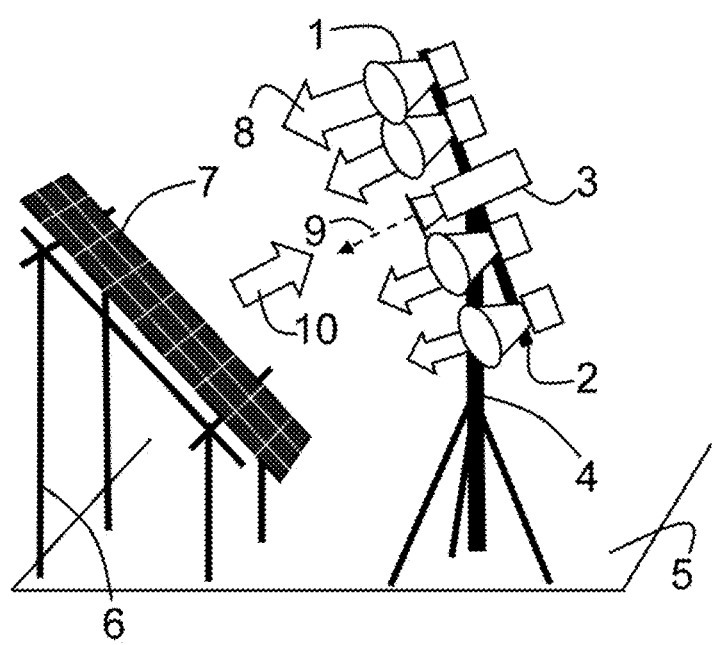

and/or the light intensity of the light sources are controlled that the solar cells are illuminated substantially uniformly, following the illumination that is substantially uniform, a photo of the solar cells is taken with the camera, the solar cells are assessed using the photo.

20 Claims, 2 Drawing Sheets

(51) Int. Cl.
    *B64D 47/08*     (2006.01)
    *G01N 21/64*     (2006.01)
    *H02S 50/15*     (2014.01)
    *H04N 23/56*     (2023.01)

(52) U.S. Cl.
    CPC ......... *G01N 21/6456* (2013.01); *H04N 23/56* (2023.01); *H04N 23/74* (2023.01)

(56) References Cited

U.S. PATENT DOCUMENTS

| | | | |
|---|---|---|---|
| 6,154,034 A | 11/2000 | Lovelady | |
| 6,812,047 B1 | 11/2004 | Borden | |
| 9,641,125 B2 | 5/2017 | Johnston | |
| 2004/0106217 A1 | 6/2004 | Higgs | |
| 2011/0234790 A1 | 9/2011 | True | |
| 2015/0229269 A1* | 8/2015 | Rand | H02S 50/15 |
| | | | 324/761.01 |
| 2019/0331602 A1 | 10/2019 | Hobbs, Jr. | |
| 2021/0249993 A1* | 8/2021 | Vergnet | H01L 31/0504 |

FOREIGN PATENT DOCUMENTS

| | | |
|---|---|---|
| DE | 102019121807 A1 | 2/2021 |
| EP | 2942634 A1 | 11/2015 |
| EP | 3208937 A1 | 8/2017 |
| JP | 2019204500 A | 11/2019 |
| WO | 2002077621 A1 | 3/2002 |
| WO | 2010130013 A1 | 11/2010 |
| WO | 2011079353 A1 | 7/2011 |
| WO | 2015016016 A1 | 2/2015 |
| WO | 2018098516 A1 | 6/2018 |
| WO | 2019212981 A1 | 11/2019 |
| WO | 2020002791 A1 | 1/2020 |

OTHER PUBLICATIONS

International Search Report (ISR) with Written Opinion corresponding to counterpart International Patent Application PCT/EP2021/073737, date of mailing Jan. 24, 2022, with English translation of International Search Report.
German Office Action dated Jul. 24, 2021, corresponding to counterpart German application No. 10 2020 210 999.0.

* cited by examiner

METHOD AND SYSTEM FOR ASSESSING SOLAR CELLS

This application is a national phase of International Application No. PCT/EP2021/073737 filed Aug. 27, 2021, which claims priority to Germany (Federal Republic of) Application No. 10 2020 210 999.0 filed Sep. 1, 2020, each of which is hereby incorporated herein by reference in its entirety.

The present invention relates to a method for assessing the quality of solar cells of a photovoltaic system. The invention also relates to a system for assessing solar cells.

Photovoltaic systems typically comprise a plurality of solar modules. A solar module is a structural unit comprising a plurality of solar cells. In order to be able to generate sufficiently high electrical voltages, solar cells of a solar module are electrically connected to each other in series.

A method for measuring and assessing power losses in photovoltaic systems is known from the publication EP 2 942 634 A1.

Further prior art in this field is known from the publications WO 2010/130013 A1, AU 2016431057 A1, WO 2011/079353 A1, US 2011/0234790 A1, EP 3208937 B1 and U.S. Pat. No. 9,641,125 B2.

There is a need for assessing a photovoltaic system if it is to be accepted after its installation, if an already installed photovoltaic system is to be sold, or if damage is to be claimed from an insurance company. Routine maintenance measurements for reliable energy production, root cause analysis or detection of transport damages also comprise assessing photovoltaic systems or modules thereof.

With increasing number and size of PV systems, assessment methods that can be automated and have a high throughput are gaining importance.

Particularly suitable for the aforementioned purposes are optical methods that use imaging techniques and can be deployed in unmanned vehicles (such as drones). In particular, a photoluminescence (PL) method is suitable for this purpose.

Luminescence methods are distinguished between electroluminescence (EL) and photoluminescence (PL). The basis of both methods is the generation of charge carriers in solar modules which recombine and which then emit light with the energy of the band gap (for silicon approx. 1.1 eV or approx. 1130 nm). The emitted light is recorded with a camera suitable for the corresponding wavelengths. The photo thus obtained is evaluated to assess solar cells. A solar cell that is no longer functional does not emit light. Dark areas of an obtained photo can therefore indicate solar cells that are no longer functional, or at least solar cells that are no longer fully functional.

The main difference between the two methods is the type of excitation. In electroluminescence, the excitation is electrical. In photoluminescence, the excitation is by light. An electroluminescence measurement therefore requires an intervention in the electrical circuit, which can be avoided by using photoluminescence.

Photoluminescence methods are currently only used in the laboratory. The aim of this invention is to develop a mobile photoluminescence method suitable for outdoor use and a system for performing the method.

To achieve this aim, a method comprises the features of the first claim. A system for performing the method comprises the features of the additional claim. Advantageous embodiments are determined by the dependent claims.

The method comprises the use of a lighting device comprising one or more light sources. In particular, these are electrical light sources. Such a light source thus emits light in the case of a sufficient power supply.

The one or more light sources are fastened to a fastening device. By means of the fastening device it is achieved that the light sources are mechanically connected to each other via the fastening device. The fastening device may be a rod or a tube. The fastening device may comprise several rods and/or tubes that are connected to each other. The fastening device may be a planar structure or comprise a planar structure. The fastening device may consist of plastic and/or metal, for example. The fastening device may consist of a plurality of individual parts that are connected to one another, for example, via one or more screw connections, one or more adhesive connections, one or more welded connections, and/or one or more riveted connections. The fastening device may have been manufactured from one piece. If the fastening device consists of a plurality of parts that are detachably connected to each other, it may be disassembled to facilitate transportation of the fastening device with components fastened thereto. The fastening device may comprise a suspension for fastening the fastening device to a stand, for example. The fastening device may be movably connected to the stand to allow the fastening device to be aligned when the stand is in a fixed position. The fastening device may comprise one or more hinges to allow the geometry of the fastening device to be adjusted to the situation to be assessed, if required.

The one or more light sources are movably fastened to the fastening device and/or a light intensity control is present with which the light intensity of each light source can be changed individually. The brightness of the light can therefore be changed. For example, the one or more light sources can be pivoted. In particular, the one or more light sources can then be pivoted not only two-dimensionally, but also in a third dimension. The movable mounting is intended to ensure that different areas of a solar module can be illuminated by moving the light source relative to the fastening device. The movability is provided in a manner suitable for this. The movability is intended to enable one or more light sources to be aligned such that a desired area of a solar module is thereby uniformly illuminated. In order to be able to illuminate a desired area uniformly in a desired manner, it is alternatively or additionally provided that the light intensity of each light source can be changed individually. If there are two light sources, the light intensity of one light source can be changed without affecting the light intensity of the other light source. This is also intended to ensure that a desired area of a solar module can be uniformly illuminated.

A camera is fastened to the fastening device. The camera is selected such that it is able to take a photo of the radiation emitted by solar cells when charge carriers recombine. The camera may be movably or immovably attached to the fastening device.

In principle, it is also possible to operate the camera detached from the lightning unit with the one or more light sources. For this purpose, the camera can be detachably connected to the fastening device, for example by a quick-release fastener, in order to be able to remove the camera quickly and without tools if the situation makes this appear advantageous.

The method comprises the following steps:

The fastening device is aligned by means of the camera relative to the solar cells to be assessed in such a way that the camera axis of the camera runs as perpendicularly as possible relative to the surface of the solar cells to be assessed, i.e. impinges perpendicularly on the surface of the solar cells. The camera axis refers to the "viewing direction"

of the camera. If several light sources are distributed around the camera, then the camera axis is preferably aligned such that it runs towards the center of the area formed by solar cells that is to be assessed.

If the camera is movably fastened to the fastening device, an alignment can be achieved by moving the camera relative to the fastening device. If the camera is immovably fastened to the fastening device, the camera is aligned by moving the fastening device.

The one or more light sources are preferably aligned and/or the light intensity of the one or more light sources are preferably controlled such that the solar cells to be assessed are illuminated as uniformly as possible. By as uniformly as possible is meant as good as possible, since certain fluctuations can never be completely avoided. In general, the light sources are aligned after the camera has been aligned relative to the solar cells to be assessed. However, if it is possible to align the camera in an ideal way, so that the camera axis is exactly perpendicular to the area to be assessed, then the light sources can also be aligned before. Also, it is then generally not necessary to provide different light intensities for different light sources. In this case, the light intensity can have been set uniformly for each light source before the camera is aligned. There may be a standardized preset for the alignment of the light sources. If the camera axis is ideally aligned, then the standardized preset is sufficient. The standardized preset can be defined, for example, by snap-in points. If the light sources are in their standardized preset, the light sources are held in this position by a latching connection. By applying a sufficiently high force, the light sources can then be moved out of the latching position.

Following the illumination as uniform as possible, a photo of the solar cells to be assessed is taken with the camera. The camera is basically a digital camera, as this can provide a photo, i.e. an image, immediately without having to develop a film first. Also, a photo of a digital camera can be evaluated particularly easily in an automated manner.

The solar cells are assessed (evaluated) by means of the captured image or photo. In particular, it is checked where bright and dark areas can be seen in the photo. For example, dark areas can indicate defects.

The invention also comprises that the light sources and/or the light intensities are not aligned and/or controlled in such a way that the illumination is as homogeneous as possible. Examples of deviation from the principle of lighting as homogeneously as possible are described below.

Preferably, several light sources are present which are arranged in one plane. It is technically easier with such an arrangement to uniformly illuminate a desired area formed by solar cells.

Preferably, the multiple light sources are then arranged around the camera to be able to illuminate very uniformly. Preferably, adjacent light sources are equally spaced from one another in order to be able to illuminate very uniformly in a technically simple manner.

Preferably, there are no more than twenty light sources, so that the technical effort is not excessive. Preferably, at least four light sources are present in order to be able to illuminate a solar module of usual size sufficiently uniformly and completely. Each light source may comprise a large number of LEDs, for example 50 to 150 LEDs.

Preferably, LEDs are used to generate light. The weight of the fastening device with the components fastened to it (camera and one or more light sources) can thus be kept low.

A beamer may be used as a light source to provide uniform illumination. If several light sources are available, then each light source can be a beamer.

The one or more light sources preferably each have a short-pass filter for the generated light. The short-pass filter allows short-wave light to emerge from the light sources. Long-wave light, on the other hand, is filtered out. The camera then has a long-pass filter for the light generated by the solar cells through recombination of charge carriers. The long-pass filter ensures that only long-wave light can captured by the camera's photosensitive material. This ensures that light reflections from the surface of solar cells do not falsify the result. This is due to the fact that only short-wave light is reflected by the surface of solar cells if the one or more light sources emit only short-wave light and there are no other light sources. A light radiation of the solar cells based on the recombination of charge carriers comprises at least predominantly long-wave light.

The photosensitive material of the camera is preferably photosensitive silicon (Si) or photosensitive indium gallium arsenide (InGaAs). These materials are suitable for detecting long-wave light emitted by solar cells in the case of charge carrier recombination. Thus, the photosensitive materials act as a detector for light.

In one embodiment, when viewed from above, a rectangular solar module is to be assessed that thus comprises the solar cells to be assessed. The fastening device is then aligned so that the solar module is shown as rectangular as possible in a photo taken with the camera. The better this shape is achieved, the better the camera is aligned. The same applies to other shapes. So, for example, if a solar module should be circular, then the camera is aligned so that on a photo the solar module is shown in the same circular shape. In this case, the camera axis is aligned exactly perpendicular to the surface. However, since such an ideal alignment is often not possible, there is in addition the possibility to change the light intensity of light sources and/or to align the light sources so that a sufficiently uniform illumination is finally achieved in this way. Sufficiently uniform illumination exists when it is so uniform that the performance of solar cells can be assessed from a photo taken by the camera.

The fastening device can be fastened to a drone. Alignment of the fastening device may be performed by the drone. The fastening device can be part of the drone, i.e. it can have a dual function. For example, the fastening device can also be the housing of the drone. A photovoltaic system can be assessed particularly quickly by means of a drone, even if it is difficult to reach.

In one embodiment, the light sources do not have their own active fans in the case of a drone. Instead, the light sources are preferably arranged in such a way that the downdraft of the aircraft provides sufficient cooling. The weight is advantageously kept low.

In the case of a drone, the power supply for the camera and for the one or more light sources can be realized internally via the drone's battery. However, a separate power supply, i.e. a second rechargeable battery, is also possible.

In one embodiment, the one or more light sources and/or the camera can be moved using one or more drives. The light sources can then be aligned in a motorized manner. It is then also possible to align in an automated manner. An electric drive, for example an electric motor, is particularly suitable as a drive. A drive may be a linear drive.

The light sources and/or the camera can be fastened to the fastening device by a ball joint.

The light sources and/or the camera are preferably fastened to the fastening device by two axes and can be pivoted around each axis. The two axes preferably enclose a right angle to allow the light sources and/or the camera to be pivoted in three spatial directions. This embodiment facilitates alignment by an electric motor.

In one embodiment, one or more spacers are provided. By means of the one or more spacers, the fastening device is aligned. A spacer may be a rod or comprise a rod. A spacer may be fastened to the camera or to a light source. A spacer is preferably fastened to the fastening device for stability reasons. If there are multiple spacers, such as three or four spacers, the spacers can be placed on the surface of solar cells like the legs of a table. The spacers are then arranged so that the camera can ideally look onto the surface of solar cells that are to be assessed.

The spacers may be foldably fastened like the legs of a folding table to allow them to be folded for transport. In the folded state, the spacers may be held in place by a latching device. Two spacers may be connected by one or more struts to improve stability.

In one embodiment, the spacers are placed on solar modules adjacent to a solar module that comprises the solar cells to be assessed for alignment. This allows all solar cells of a solar module to be assessed in one operation by uniformly illuminating the full area of the solar module and then having the camera take a photo of the entire area of the solar module, which is then evaluated.

The one or more spacers may have rollers at their lower end to allow the fastening device to be moved to an ideal position by rolling. The one or more spacers may be widened at their lower end to avoid point loads on solar modules if spacers are placed on solar modules.

If there is contact with solar modules or the ground during the performance of the method, such as by one or more spacers, movement of the fastening device can be performed with rollers or skids with or without external rails. External rails may be fastened to or at the modules to perform the method. Alternatively, spaces between modules can be used as rails.

The method is preferably performed in an automated manner, controlled by a computer. In order to be able to perform the method in an automated manner, it can be stored in the computer or selected on a screen of the computer which surface shape a solar module has whose solar cells are to be assessed. If the solar cells of a solar module with a rectangular surface are to be assessed, then the rectangular shape can be stored in the computer or selected by means of the screen and an input device. Alignment is then performed by comparing the shape provided to the computer by the camera connected to the computer.

The fastening device is moved by means of the computer until the transmitted shape is maximally similar to the stored or selected shape. Subsequently, the light sources are moved and/or the light intensities of the light sources are changed until the computer has determined the most uniform illumination possible by means of the camera. Subsequently, the computer triggers the taking of a photo by the camera. Finally, the computer may evaluate the photo and issue a status report.

If the fastening device is connected to a drone, the computer controls the flight of the drone for alignment. The fastening device can be set up on a surface and comprise a boom that can be moved by a drive, to which boom the camera and the one or more light sources are fastened. The computer may then control, for example, a motorized movement of the boom to align the camera relative to the solar cells to be assessed. Alternatively or complementarily, the computer may control motorized pivoting of the camera.

In one embodiment, for example, to align the light sources and/or to control the light intensities of the light sources, a flat fluorescent or phosphorescent material is placed on the solar cells to be assessed. Following the placement, the light sources illuminate the fluorescent or phosphorescent material. If short-wave light now strikes the fluorescent or phosphorescent material, at least also long-wave light is reflected back. The light sources are preferably switched off and a photo is taken when phosphorescent material has been applied. It is thus made possible that a photo of the illuminated surface can be taken by the camera, which is suitable for an inspection. Such a photo can then be evaluated by the computer, so that the computer can control in a technically simple manner an alignment of the light sources and/or a regulation of the light intensities of the light sources in order to achieve the most homogeneous illumination possible. However, such a photo can also be used to make inhomogeneity measurements with fluorescent or phosphorescent material for subsequent or real-time adjustment of the photos. For example, it can then be calculated out which brightness variations are due to inhomogeneities in the illumination in order to assess solar cells in a further improved manner.

The method is suitable for outdoor use. For example, solar modules of a photovoltaic system already mounted on the roof of a building can be assessed without having to intervene in the circuit of the photovoltaic system. The method is basically performed in darkness to avoid disturbing light influences by the sun.

External influences such as ground unevenness, angles of attack of solar modules and sources of interfering light can be compensated for by the method. Thus, despite such disturbances, sufficiently homogeneous illumination of solar cells is achieved in order to be able to reliably detect defects.

The invention also relates to a system for performing a method with a fastening device and with one or more light sources fastened to the fastening device. The one or more light sources are movably attached to the fastening device and/or a light intensity control is provided, with which the light intensity of each light source can be individually changed. A camera is fastened to the fastening device. The one or more light sources are such that they can only emit short-wave light. The one or more light sources may therefore each comprise a short-pass filter, by which it is achieved that only short-wave light can emerge from the light sources. The camera is such that it can only receive long-wave light for taking a photo. The camera may therefore comprise a long-pass filter by which it is achieved that only long wave-light can enter the camera. Short-wave light in the sense of the invention has a shorter wavelength than long-wave light.

A drone may be fastened to the fastening device. This also comprises that the fastening device is at the same time part of the drone, for example part of a housing of the drone.

Preferably, the system comprises at least three or four light sources. Preferably, the system comprises no more than twelve light sources. In one embodiment, the system comprises four to eight light sources. A solar module typically comprises about 60 solar cells. The area to be illuminated of such a solar module is about 1.6 m$^2$. With four to twelve light sources, such an area can be sufficiently homogeneously illuminated.

The system may comprise a plurality of detachable lightning units in order to be able to scale. Each lightning unit may comprise one or more light sources. A lightning unit is then detachably fastened to the fastening device. Depending on the need, lightning units can be added or removed. There are then electrical plug connections to supply added lightning units with electricity and, if necessary, to connect them to a light intensity control.

The light sources of the system may be arranged in a first plane. The camera may be arranged behind the plane. With such an arrangement it is possible that during the performance of the method the light sources are closer to the solar cells to be assessed than the camera. In this way, homogeneous and high-intensity illumination of the solar cells to be assessed is achieved particularly well. Because the camera is at a greater distance from the solar cells, a small focal length can suffice to still be able to photograph a large area.

By using powerful light-emitting devices (LEDs), the weight of the system can be kept particularly low.

The system can be mobile, lightweight and flexible so that it can be held and aligned manually, for example, with little effort.

The focal length of the camera can be adjusted to the requirements. A large focal length may have been selected if the distance between the solar module and the camera is to be small and yet the entire surface of the solar module is to be captured by a photo. A small focal length may have been selected if the distance between the solar module and the camera should be small and only a part of a surface of the solar module should be captured by a photo.

A suspension for the fastening device of the system may be designed flexibly in order to be able to compensate for small and large unevenness of the ground and holes, especially in the case of ground-mounted systems, in three dimensions. Since the weight can be low, the system can then be placed on solar panels using spacers without damaging them. A drone-based system is possible.

The main problem with qualitatively and quantitatively usable photoluminescence images is the linear dependence of the photoluminescence signal on the excitation intensity. With the provided cameras, very low intensities can be detected in the spectrum suitable for silicon, for example. In addition, the invention allows a common solar module to be completely illuminated with sufficient homogeneity.

Defects that can be detected by the invention include cracks, cell abnormalities or inactive areas.

Large-area defects such as potential induced degradation (PID), other defects with reduction of parallel resistance, or module defects such as shorted bypass diodes are not detectable or are more difficult to detect with poor homogeneity of illumination. The invention can achieve sufficient homogeneity to be able to detect such defects as well.

The homogeneity has an influence on the detection of all defect signatures and can both complicate and simplify these. According to the invention, inhomogeneous illumination can also be achieved if this can simplify the detection of defects.

The invention enables full-area illumination of the surface of a usually large solar module, but also of individual solar cells. Areas between the size of a solar cell (about 250 cm$^2$) up to the size of the surface of a solar module (about 1.6 m$^2$) can be illuminated.

In order to adapt the homogeneity to the detection of all defect signatures for each module, the light sources are flexibly controllable.

The invention enables integration of the camera and light sources, for example LED modules, into a drone. To be able to keep the power demand low, the light intensity can be kept low. If necessary, the areas to be examined can be selected to be correspondingly small. By taking a plurality of photos of partial areas of a solar module, a solar module can be fully assessed with high resolution.

A hand-held system can be provided by the invention. This can be small enough that photos can be taken of only partial areas of a solar module. However, by taking photos of different partial areas, solar modules can be fully inspected and then also with particularly high resolution. However, a hand-held system can also be dimensioned in such a way that a solar module of usual size can be completely uniformly illuminated, in order to be able to assess the entire solar module with only one photo.

In the case of hand-held systems, care should be taken to reduce the weight to such an extent that it can be handled by only one user.

The distance between the solar modules on the one hand and the camera/lightning unit on the other hand is preferably small in order to be able to use light sources that are weaker in light and therefore particularly light. This can be compensated for by using a lens with a long focal length. Solar modules can be scanned in such an operation. Due to a short distance and scanning, the light sources do not have to be constantly aligned in order to image homogeneous irradiation. Rather, in handheld operation, the ideal alignment of the camera/lightning unit to the solar modules can be manually adjusted by the user. Light sources and camera can then be one construction unit.

In one embodiment of the invention, light sources can be located in one plane during the performance of the method and the camera is located behind this plane.

Post-processing and composition of taken photos or photo sequences to a complete image is possible (stitching). An increase of the resolution with super resolution algorithms from photos or photo sequences is possible.

By means of the invention, the illumination intensity can be varied in order to be able to detect cell behavior and thus, if necessary, defect patterns.

High illumination intensities can be achieved by the invention. Up to 1000 W/m$^2$ has been found to be possible.

Figure 2:
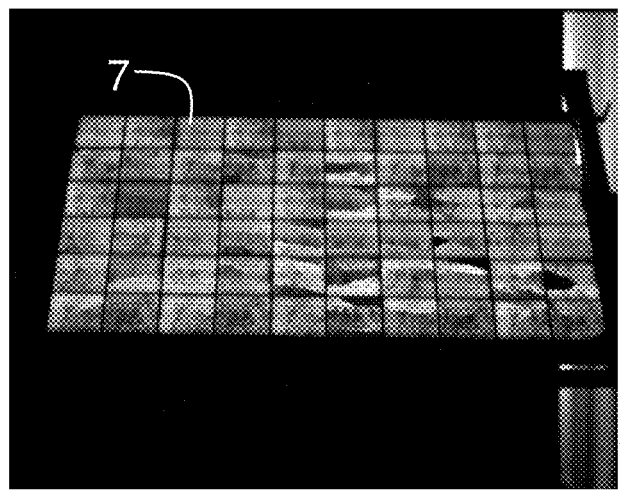
Figure 3:
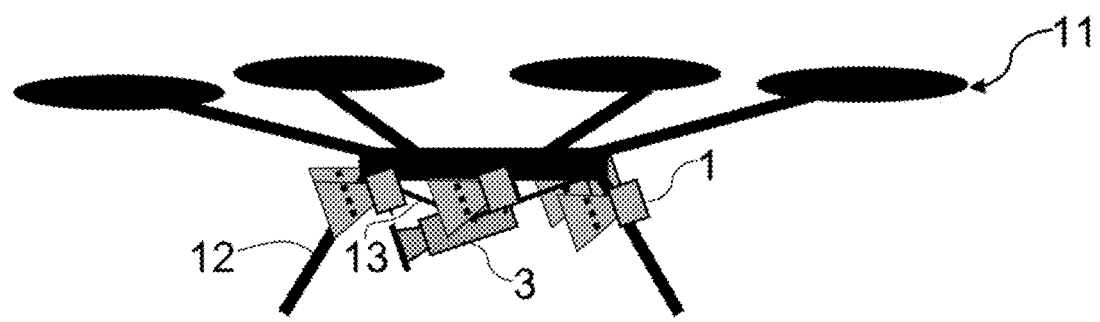
Figure 4:
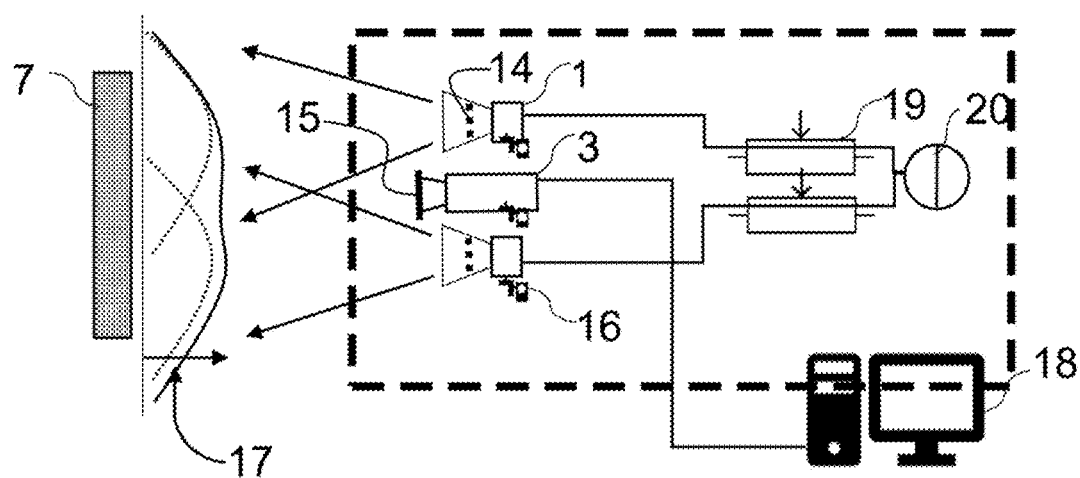

The invention is explained in more detail below with reference to figures. They show FIG. 1: Schematic drawing of the structure and the difference in perspective between the lamp field and the angle of attack of a solar module;

FIG. 2: Example of a shot for perspective distortion;

FIG. 3: Drone with light sources and camera;

FIG. 4: Sketch of components.

FIG. 1 shows a schematic diagram of a system according to the invention. The system comprises a lighting device with four light sources 1. The four light sources 1 are movably fastened to a fastening device 2. Each light source can be swiveled in three spatial directions. The fastening device 2 is a rod or a tube. The four light sources are arranged along a straight line. Since a straight line can lie in a plane, the light sources are also arranged within a plane.

With a light intensity control, which is not shown, the light intensity of each light source can be changed independently of the other light sources. Each light source can also be switched off completely independently of the other light sources.

A camera 3 is fastened to the fastening device 2. The camera 3 is mounted in the center between the light sources 1. The camera mounting is therefore performed in the center of the light that can be generated by the light sources 1.

The fastening device 2 is movably fastened to a stand 4. The stand 4 stands on the base 5 on which the stud frames 6 for the solar module 7 stand.

The light sources 1 are aligned such that light 8 emitted by the light sources impinges on the surface of the solar module 7 to be illuminated.

First, the fastening device 2 was aligned relative to the surface of the solar module 7 to be illuminated and thus relative to the surface of the solar cells to be illuminated in such a way that the camera axis 9 of the camera 3, i.e. the viewing direction of the camera 3, impinges as perpendicularly and centrally as possible on the surface of the solar cells to be assessed. For this purpose, the fastening device 2 was swiveled in such a way that it runs as parallel as possible to the surface of the solar module 7 to be illuminated. FIG. 1 shows the case where this was only approximately possible. Subsequently, the light sources 1 were aligned in such a way that they can illuminate the full area of the surface of the solar module 7 to be illuminated as uniformly as possible. As shown in FIG. 1, upper light sources 1 have a greater distance to the surface of the solar module 7 to be illuminated than lower light sources 1. To compensate for this, the upper light source 1 emits light 8 with a greater light intensity than light sources 1 below it. This is indicated by the size of the arrows 8, which represent the emission of light. The lower a light source 1 is positioned, the smaller the arrow and the smaller the light intensity. In this way, uniform illumination of the surface to be illuminated of the solar module 7 is achieved. The surface to be illuminated is the surface that is to be illuminated in order to be able to generate electricity by means of the solar cells of the solar module 7.

Following the achieved illumination, which is as uniform as possible, a photo of the solar cells to be assessed is taken with the camera 3. The light 10, which is generated by the solar cells due to the illumination by the light sources 1, is photographed. By means of the taken photo the solar cells of the solar module are assessed.

In the FIG. 1 four light sources 1 are shown. However, the number of light sources 1 can be larger or smaller. An upper limit of twelve light sources 1 has proven to be practicable. 100 W COB LEDs have proved suitable as light sources 1. Twelve such light sources are sufficient for homogeneous illumination of a full solar module. The LEDs of each light source can be mounted on an LED module with fan and control board. As optics for each light source, a parabolic mirror with a glued-in short-pass filter (e.g. a Schott "KG5" heat protection glass) may be present. The parabolic mirror directs the generated light in a desired direction. The light first passes through the short-pass filter before leaving light source 1. The power supply may be provided by suitable power adapters or batteries.

The camera 3 is selected to detect the light generated by the solar cells by recombination of charge carriers. A long-pass filter with a cut-on wavelength of 970 nm is used to reliably filter out the light generated by the solar cells by recombination of charge carriers. The light generated by recombination of charge carriers first passes through the long-pass filter before it can strike the photosensitive material of the camera.

A control computer, not shown in FIG. 1, for the camera and for algorithms to optimize the homogeneity of the illumination by controlling the LED excitation intensity may be provided.

A system such as that shown in FIG. 1 can be used to flexibly and quickly respond to the perspective distortion of the solar modules for each position of a solar module to provide homogeneous illumination. The flexibility of the light sources 1 can generate for each defect signature the excitation distribution necessary for the best detection rate. This can be automated. After taking a test photo, an adjustment can be made. The result can be checked on the basis of a next test photo in order to continue the adjustment, if necessary. Photos of a complete surface of a common sized solar module are possible even under difficult external conditions without physical and electrical contact to the solar module.

FIG. 2 shows a photo of a rectangular solar module when the camera axis is not exactly perpendicular to the surface of the solar module to be illuminated. The photo illustrates that the solar module is shown in the photo to be only approximately rectangular.

In the example case of FIG. 2, the ratio of the upper and lower solar module edges is about 1.14. Assuming a quadratic intensity reduction of an LED excitation radiation, the LEDs illuminating the solar module upper surface would have to provide about 30% more power to achieve a sufficiently high homogeneity. Thus, in such a case, it is still possible to achieve a sufficiently homogeneous illumination by controlling the light intensities.

FIG. 3 shows a drone 11 on which the camera 3 and the light sources 1 are movably fastened. There are a total of six movably fastened light sources 1. These are movably fastened on both sides to legs 12 and a strut 13, respectively. Light sources 1 on one side of the drone are equally spaced. The camera 3 is arranged centrally below the housing of the drone 11. Legs 12 and strut 13 serve as parts of the fastening device.

FIG. 4 shows a solar module 7 illuminated by two light sources 1 with short-pass filter 14. The two light sources 1 are aligned so that the solar module 7 is illuminated as homogeneously as possible, as indicated by the brightness distribution 17 on the surface of the solar module 7. Photos of the surface of the solar module 7 are taken through the camera 3 with the long-pass filter 15. The camera 3 and the light sources 1 are movably mounted by a fixture 16 and can be pivoted about two mutually perpendicular axes as indicated. The light intensities of the light sources 1 can be changed by potentiometers 19. There is a power supply 20 for the light sources 1. The camera 3 is supplied with electrical power via a computer 18.

The invention claimed is:

1. A method for assessing solar cells with one or more light sources, wherein the one or more light sources are fastened to a fastening device, wherein the one or more light sources are fastened movably to the fastening device and/or a light intensity control is present, with which the light intensity of each light source can be changed independently of the light intensity of the other light sources, with a camera which is fastened to the fastening device, wherein the method comprises the following steps, the fastening device is aligned relative to solar cells using the camera in such a way that the camera axis of the camera is as perpendicular as possible relative to the surface of the solar cells to be assessed, the one or more light sources are aligned in such a way and/or the light intensity of the one or more light sources are controlled in such a way that the solar cells to be assessed are illuminated as uniformly as possible, following the illumination that is as uniform as possible, a photo of the solar cells to be assessed is taken with the camera, the photo being of received light received by the camera, the received light being generated by the solar cells due to the illumination of the solar cells, the solar cells are assessed using the photo, wherein there is no intervention in an electrical circuit of the solar cells.

2. The method according to claim 1, wherein the light sources are arranged in one plane.

3. The method according to claim 1, wherein not more than twenty light sources and/or at least four light sources are present.

4. The method according to claim 1, wherein each light source comprises one or more LEDs.

5. The method according to claim 1, wherein the light sources comprise a short-pass filter for the generated light and the camera comprises a long-pass filter for the light received by the camera.

6. The method according to claim 1, wherein the camera comprises photosensitive silicon or photosensitive indium gallium arsenide (InGaAs) for the detection of light.

7. The method according to claim 1, wherein a rectangular solar module seen in plan view comprises the solar cells to be assessed and the fastening device is aligned in such a way that the solar module is shown as rectangular as possible on a photo taken with the camera.

8. The method according to claim 1, wherein the fastening device is fastened to a drone and the alignment of the fastening device is performed by the drone.

9. The method according to claim 1, wherein the one or more light sources can be moved by means of one or more drives.

10. The method according to claim 1, wherein spacers are present and the fastening device is aligned by means of the spacers.

11. The method according to claim 10, wherein the spacers for the alignment are placed on solar modules arranged adjacent to a solar module comprising the solar cells to be assessed.

12. The method according to claim 1, wherein a sheet-like fluorescent or phosphorescent material is placed on the solar cells to be assessed, and the sheet-like fluorescent or phosphorescent material is illuminated by the one or more light sources and, following the illumination, a photo is taken of the radiation produced by the fluorescent material or the phosphorescent material.

13. A system for performing a method according to claim 1 with a fastening device and one or more light sources fastened to the fastening device, wherein the one or more light sources are movably fastened to the fastening device and/or a light intensity control is present, with which the light intensity of each light source can be changed independently of the light intensity of the other light sources, with a camera which is fastened to the fastening device, wherein the one or more light sources are such that they can only transmit short-wave light and the camera is such that it can only receive long-wave light for taking a photo.

14. The system according to claim 13 comprising a drone to which the fastening device is fastened.

15. The system according to claim 13, wherein the system comprises three to twelve light sources.

16. The method according to claim 1, wherein the camera is a digital camera configured to take a photo of the radiation emitted by the solar cells when charge carriers recombine.

17. The system according to claim 13, wherein the camera is a digital camera configured to take a photo of the radiation emitted by the solar cells when charge carriers recombine.

18. The method according to claim 1, wherein the light sources are fastened to the fastening device by a ball joint.

19. The method according to claim 1, wherein there is no electrical connection between the camera and the solar cells.

20. The method according to claim 1, wherein the method is a contactless method with no contact between the camera and the solar cells.

* * * * *